Jan. 25, 1944. M. TAMA 2,339,964
SUBMERGED RESISTOR INDUCTION FURNACE
Filed Oct. 21, 1942 2 Sheets-Sheet 1

INVENTOR.
Manuel Tama
Frank T. Chesnut
BY
ATTORNEY.

Jan. 25, 1944. M. TAMA 2,339,964
SUBMERGED RESISTOR INDUCTION FURNACE
Filed Oct. 21, 1942 2 Sheets-Sheet 2

INVENTOR.
MANUEL TAMA
BY
ATTORNEY.

Patented Jan. 25, 1944

2,339,964

UNITED STATES PATENT OFFICE 2,339,964

SUBMERGED RESISTOR INDUCTION FURNACE

Manuel Tama, Morrisville, Pa., assignor to Ajax Engineering Corporation, Trenton, N. J.

Application October 21, 1942, Serial No. 462,866

5 Claims. (Cl. 13—29)

This invention relates to a submerged resistor type induction furnace for melting light metals.

Light metals include aluminum and magnesium and alloys in which aluminum or magnesium are predominant and where heavy metals like copper, manganese, iron, zinc and others may be present in smaller quantities. Aluminum and magnesium are in many ways similar in the properties which affect the use of induction furnaces for melting. The density of these metals in the molten state is lower than that of their slags. The result is that oxides, nitrides and other impurities formed during the melting process sink to the bottom of the furnace and obstruct the submerged resistor or melting channel. If no special precautions are taken, the electrical circuit through the melting channel is interrupted and the furnace lining is destroyed.

In order to adapt a submerged resistor type furnace for continuous melting of light metals, two methods have been proposed. In one method, the secondary channel is made of comparatively large cross section and the furnace is emptied completely every few hours so that the melting channel can be cleaned, usually by means of special tools or flexible chains. In the other method, the secondary channel is made accessible from the outside at its lowest part, where most of the dirt usually accumulates. A clean-out door or opening is provided at the bottom of the melting channel, which can be sealed with a plug during melting, but which can be uncovered to allow removal of the slag it accumulates.

The furnace of the present invention is an improvement over furnaces utilizing both of the methods described, in that its construction not only allows easy access for cleaning but it is so designed that the usual impurities or slags are restrained from collecting at a rapid rate in the melting channel and the need for cleaning is much less frequent. By constructing the furnaces as described in this specification, the furnace may be operated for periods eight or ten times as long before cleaning as compared with furnaces heretofore designed.

A purpose of the present invention is to provide a submerged resistor type induction furnace for melting light metals which, by its construction, will allow less nonmetallic matter to accumulate in the melting channel and which will not be subject to frequent interruption.

Another purpose is to provide a submerged resistor type induction furnace for melting light metals in which the melting channel is so shaped that nonmetallic matter is largely and automatically prevented from entering it and in which a collecting chamber is located at the bottom of the furnace so that what nonmetallic matter does not enter from the molten bath may fall clear of the melting ducts for periodic cleaning from below.

Another purpose is to provide a submerged resistor type induction furnace, for melting light metals, having higher power factor than others heretofore designed.

Further purposes will become apparent from the specification and the accompanying drawings.

Two figures have been used by way of illustration of the invention.

Figure 1:
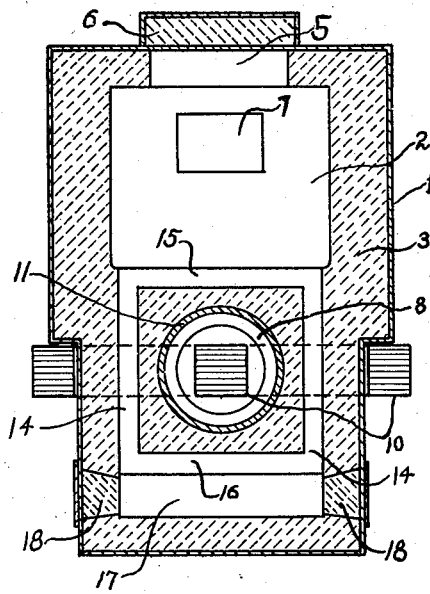
Fig. 1 is a sectional elevation view of the furnace from the front. The section is taken in the plane of the melting channel.

In general construction the furnace of the present invention is similar to submerged resistor furnaces of customary design. A lengthy description of the principle of operation is believed to be unnecessary. The principal parts are a housing 1, comprising a hearth 2, and a melting section. The hearth is adapted to hold the bulk of a charge of metal to be melted and is lined with refractory material 3, on its sides, bottom and top. A pouring spout 4 is provided as well as a charging opening 5 and cover 6. A cleanout door 7 may be provided if desired. Depending from the hearth in the melting section is a submerged resistor or melting channel which is formed as a loop in the refractory material 3. This loop when filled with molten metal forms the secondary of a transformer system, the primary of which is threaded through it. The primary comprises a plurality of spaced and insulated turns of an electrical conductor and is connected, in operation, to a supply source of low frequency alternating current, not shown. In the drawing the coil is represented by the numeral 8 and the insulation between turns by the numeral 9. An iron core 10 threads the primary winding and is closed on itself on either or both sides of the furnace. The transformer primary asembly usually is insulated from the refractory of the melting loop by an asbestos cylinder 11 and is contained in a housing 12, through which a cooling stream of air may be passed as by a blower 13.

The foregoing description would apply to almost any submerged resistor type induction furnace. The features which lend patentability to a particular combination are in the design and arrangement of the melting channel, or other features which make the furnace commercially practicable for melting a certain metal or alloy or for carrying on a metallurgical process not before disclosed. In the present instance, the furnace is especially designed and adapted for the melting of light metals, and the variations which make it thus adaptable are believed to be new and patentable.

Referring again to the figures it will be noted that the construction of the melting channel is different from the melting channels in other types of submerged resistor furnace. The channel in the present invention comprises two vertical leg members 14 which are substantially straight and parallel. They enter the melting hearth abruptly and without change in cross sectional area. On their upper and lower ends they connect with grooves or channels 15 and 16 respectively, of substantially the same cross section as the legs. These grooves or channels are in turn in open contact throughout their length with the main hearth chamber 2 and with a collecting chamber 17 respectively. The collecting chamber may be of any convenient size but is sufficiently large to hold all the slag and impurities which may fall into it over a reasonable period of operation without obstructing the normal current path. It is also sufficiently large to reduce the current concentration flowing in that portion of the transformer secondary or melting channel to the point where overheating will not result. As crowding of the current toward the inside of the secondary loop is inherent in this type of furnace it is sometimes necessary to widen the channel axially of the length of the transformer primary winding rather than to deepen it radially of same to effect the proper reduction of current concentration.

The effective grooving of the secondary or melting channel of the furnace around its full circumference gives a control in the present furnace not usually found in induction furnaces of other types and accounts largely for the considerably higher power factor obtainable in this furnace. The power factor of a medium size (125 kw.) furnace of the present design averages as high as fifty per cent as compared with thirty-five per cent for furnaces of comparable size and ordinary design. By grooving or channeling the secondary throughout its path the current and power characteristics are relatively independent of the collection of slag or impurities in the bottom chamber; and since the more or less vertical side channels may be cleaned during operation the furnace is not materially affected by the building up or formation of compounds in these sections.

Figure 2:
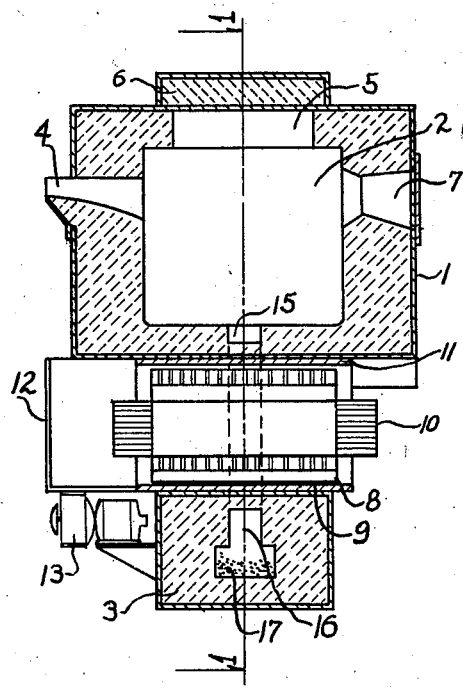
Fig. 2 is a sectional elevation view of the same furnace taken from the right side in a plane at right angles to that of Fig. 1.
Figure 3:
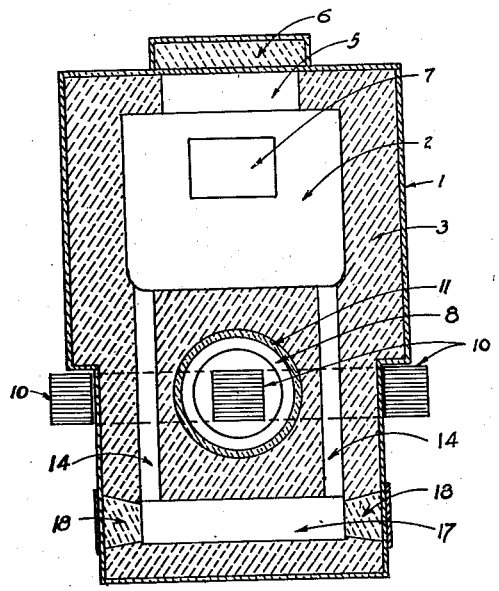
Fig. 3 is a sectional front elevation of a second form of the furnace.
Figure 4:
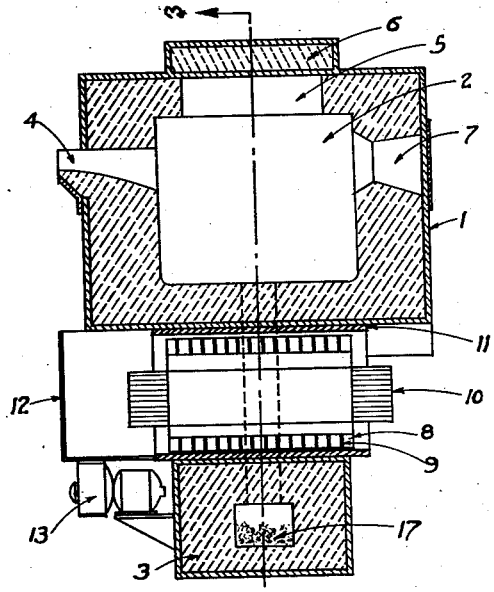
Fig. 4 is a sectional view of the same furnace taken on line 3—3 of Fig. 3.

The main characterisation of the invention comprising the substantially vertical and straight melting channels entering the hearth under avoidance of outflaring end sections is also apparent from the embodiment of the invention illustrated in Figs. 3 and 4, where identical parts to those shown in Figs. 1 and 2 are denominated with the same numerals.

Where the straight melting channels 14 join the melting hearth 2, the connection is abrupt; there is no change of the cross area, where the channels 14 enter the hearth. It is not known exactly why this feature improves the operation of the furnace for aluminum melting but by making the channels this way there is considerably less build-up of compounds on the channel walls which tend to obstruct the openings and there is considerably less accumulation of these compounds in the collecting chamber below the channel. It is believed that the circulation which is set up by the particular arrangement of the vertical melting channels, with the hearth and with the collecting chamber below, automatically and effectively keep the compounds from falling into the tubes or that the flaring openings customarily employed invite the accumulation of same. At any rate, actual tests prove conclusively that the shaping and designing of furnaces as herein described extends the operating life eight to tenfold over submerged resistor type furnaces heretofore operated on aluminum and the light metals.

In this as in all furnaces of this type, there will be some collection of oxides or nitrides in the channel and in the chamber below the channel so the furnace is provided with openings in the collecting chamber which can be closed by plugs 18 during operation but opened to allow access for cleaning after the furnace has been emptied.

The furnace herein described offers a new tool for the aluminum and light metal industry. It can be made in sufficiently large size to be practicable for the operations engaged in by the industry. Because of its control, lower melting losses and long operating life it bids well to replace other types of furnace for melting the light alloys. The furnaces are provided with the usual handling, tilting, and operating controls.

Applicant believes that his furnace embodies new and practical designs and requests that U. S. Letters Patent be granted to him for all that is claimed as follows:

1. A submerged resistor induction furnace for melting light metals and light metals containing alloys comprising a transformer primary winding threading a secondary melting channel, said channel comprising substantially vertical legs of uniform cross section connecting at their upper and lower ends respectively with grooves which in turn open respectively throughout substantially their whole lengths into a main hearth above and into a collecting chamber below the melting channel, the width of said grooves being substantially equal to the width of the vertical legs.

2. A submerged resistor induction furnace for melting light metals and light metals containing alloys comprising a transformer primary winding threading a secondary melting channel, said channel comprising substantially vertical legs of uniform cross section connecting at their upper and lower ends respectively with grooves which in turn open respectively throughout substantially their entire lengths into a main hearth above and into a collecting chamber below the melting channel, the width of the upper groove being substantially equal to the width of the vertical legs.

3. A submerged resistor-type induction furnace for melting light metals and light metals containing alloys comprising an upper melting hearth, a collecting chamber underneath the said upper melting hearth, a transformer assembly between the upper melting hearth and the collecting chamber, a plurality of substantially straight heating channels, each having a substantially uniform cross section over its entire length connecting the melting hearth with the said chamber under avoidance of outflaring channel end portions, the said collecting chamber having a larger cross section than the heating channels.

4. A submerged resistor induction furnace for melting light metals and light metals containing alloys comprising an upper melting hearth, a collecting chamber underneath the said upper melting hearth, a transformer assembly between the upper melting hearth and the collecting chamber and a plurality of substantially straight heating channels, each channel having a substantially uniform cross section over its entire length and entering the melting hearth under avoidance of outflaring channel end portions, the said collecting chambers having a larger cross section than the heating channels.

5. A submerged resistor induction furnace for melting light metals and light metals containing alloys comprising a transformer primary winding threading a secondary melting channel, said channel comprising substantially vertical legs of uniform cross section connecting at their upper and lower ends respectively with grooves which in turn open respectively throughout substantially their whole lengths into a main hearth above and into a collecting chamber below the melting channel, the said collecting chamber having a larger cross section than the heating channels.

MANUEL TAMA.